United States Patent [19]

Altmann

[11] 4,269,541
[45] May 26, 1981

[54] IMPLEMENT FOR THE LAYING OF CABLES AND THE LIKE

[76] Inventor: Marcel Altmann, Rte. de 10. Septembre, 22, Luxembourg, Luxembourg

[21] Appl. No.: 955,144

[22] Filed: Oct. 26, 1978

Related U.S. Application Data

[63] Continuation-in-part of Ser. No. 827,676, Aug. 25, 1977, abandoned.

[30] Foreign Application Priority Data

Aug. 30, 1976 [DE] Fed. Rep. of Germany ....... 2639014

[51] Int. Cl.³ .............................................. F16L 1/02
[52] U.S. Cl. .................................. 405/181; 405/183; 172/744
[58] Field of Search ............... 405/164, 174, 180, 181, 405/183; 37/98, 193; 172/744

[56] References Cited

U.S. PATENT DOCUMENTS

| 178,957 | 6/1876 | Reynolds | 405/181 |
|---|---|---|---|
| 2,755,571 | 7/1956 | Clark | 37/98 |
| 3,065,557 | 11/1962 | Pewthers | 405/174 X |
| 3,515,222 | 6/1970 | Kant | 405/181 X |
| 3,684,030 | 8/1972 | Lucero | 405/180 X |
| 3,952,532 | 4/1976 | Spearman | 405/164 |
| 4,119,157 | 10/1978 | Schuck et al. | 405/181 X |

Primary Examiner—David H. Corbin
Attorney, Agent, or Firm—Robert W. Beach; Ward Brown; Douglas E. Winters

[57] ABSTRACT

A plow-like trench cutter is carried by a slide movable vertically between spaced upright ways rigidly coupled to a tractor. The trench cutter has a passage for supplying a line, such as cable or pipe, generally to the bottom of the cutter so that when the tractor is moved to cut a trench, the line is laid in the trench cut. A jackscrew carrying the slide can adjust the elevation of the trench cutter relative to the tractor to alter the depth of the trench. The angle of attack of the leading edge of the trench cutter can be adjusted by turning a turnbuckle spindle that extends through a nut carried by the cutter and a nut carried by the slide. The leading edge of the trench cutter is composed of a plurality of bars reciprocable transversely of their lengths.

7 Claims, 7 Drawing Figures

Fig. 4
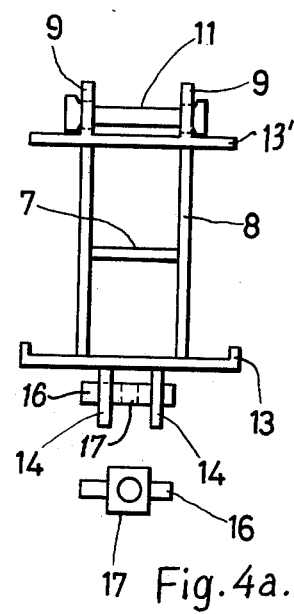
Fig. 3
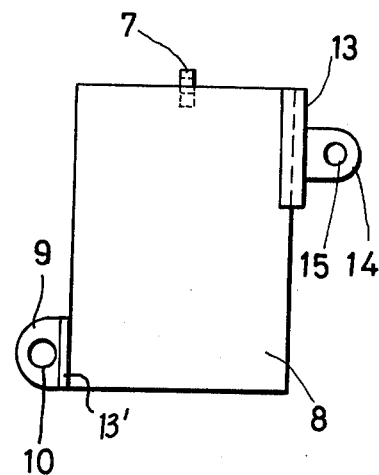
Fig. 4a.

IMPLEMENT FOR THE LAYING OF CABLES AND THE LIKE

This application is a continuation-in-part of application Ser. No. 827,676, filed Aug. 25, 1977, for Implement for the Laying of Cables or Similar, now abandoned.

BACKGROUND OF THE INVENTION

1. Field of the Invention

The present invention relates to line-laying apparatus for a tractor for simultaneously digging a trench and laying a line in the trench as the tractor is moved.

2. Prior Art

In order to bury underground a line of electric cable or piping it is customary first to dig a trench into which the cable or pipe is to be laid, lay the cable or pipe and afterwards backfill the ditch. This process is expensive and time-consuming.

Trench-cutting tools are known in which a plow-like element is coupled to a tractor for pivoting about an axis spaced a substantial distance from the plow-like element and extending generally transversely of the tractor. Pivoting of the plow-like element about such axis changes the depth of the trench cut by the plow-like element as the tractor is moved. A problem with such tools is that the angle of attack, that is, the angle which the leading or cutting edge of the plow-like element makes with the direction of travel of the tractor, changes as the plow-like element is swung to vary the depth of the trench it cuts.

SUMMARY OF THE INVENTION

It is an object of the present invention to provide line-laying apparatus for a tractor including a trench cutter in which the work position of the trench cutter remains unchanged even when the elevation of such cutter is changed to change the depth of the trench cut.

The foregoing object can be accomplished by providing a trench cutter adjustable elevationally relative to a frame that is rigidly coupled to a tractor and mechanism for effecting such elevational adjustment.

In the preferred embodiment of the invention, the trench cutter is carried by a slide fitted between ways of a frame mounted on the rear of a tractor. The slide is carried and adjusted by a powered jackscrew.

Mechanism is provided to swing the trench cutter relative to the slide, shown in FIGS. 3 and 4 and the frame to alter the angle the leading or cutting edge of the cutter makes with the direction of travel of the tractor. Such leading or cutting edge is formed by the forward and downward slanting edges of a plurality of cutter bars reciprocated transversely of their lengths, each bar being reciprocated independently of the other bars.

A passage for supplying cable or pipe line generally to the bottom of the trench cutter extends through such cutter and guide rollers are located at opposite sides of the passage.

BRIEF DESCRIPTION OF THE DRAWINGS

FIG. 3 is a side elevation of the preferred form of slide to fit between ways of the frame of FIG. 2, FIG. 4 is a top plan of such slide, and FIG. 4a is an end elevation of one component of such slide.

DETAILED DESCRIPTION

Figure 1:
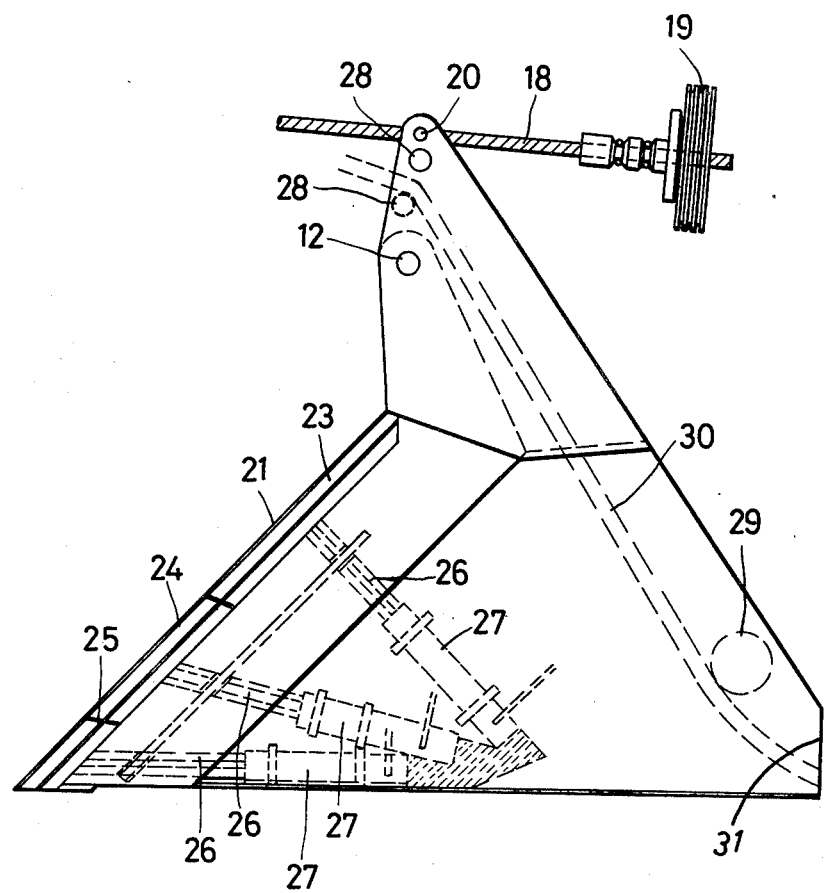
FIG. 1 is a side elevation of the preferred form of trench cutter used in the present invention.
Figure 2:
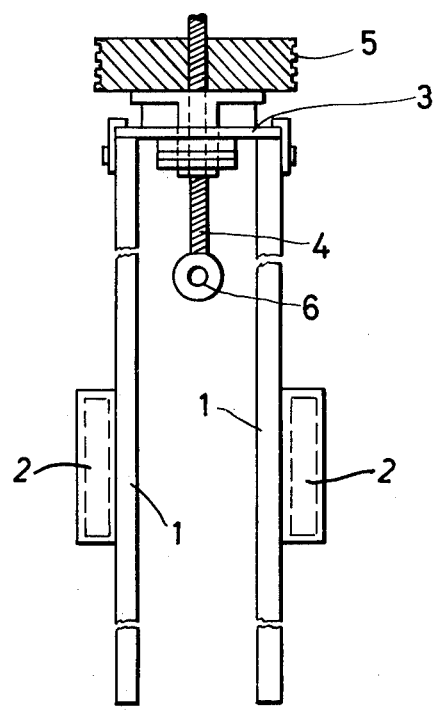
FIG. 2 is a rear elevation of the preferred form of frame and mechanism used for adjusting the elevation of the trench cutter.
Figure 5:
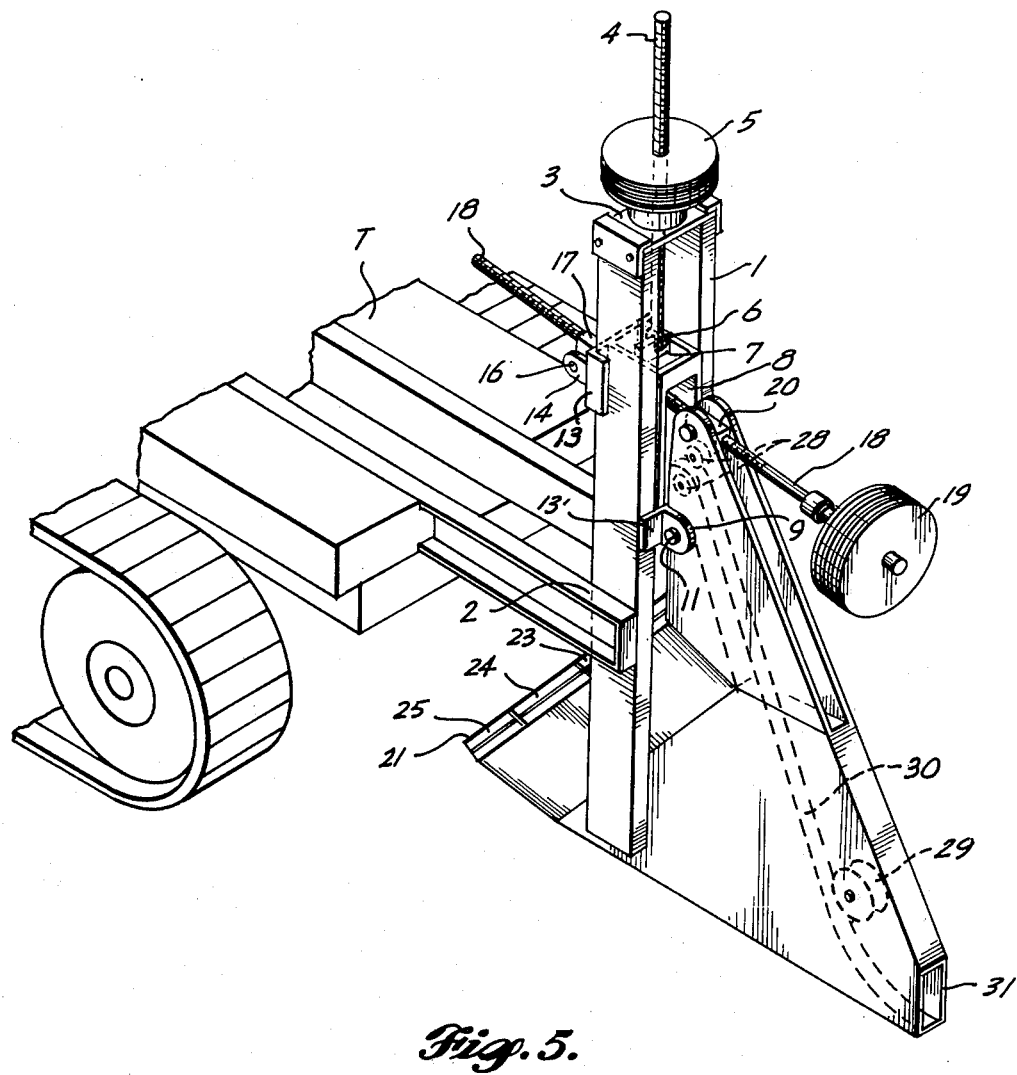
FIG. 5 is a top perspective of line-laying apparatus in accordance with the present invention showing the various components in assembled relationship, such apparatus being coupled to a tractor.
Figure 6:
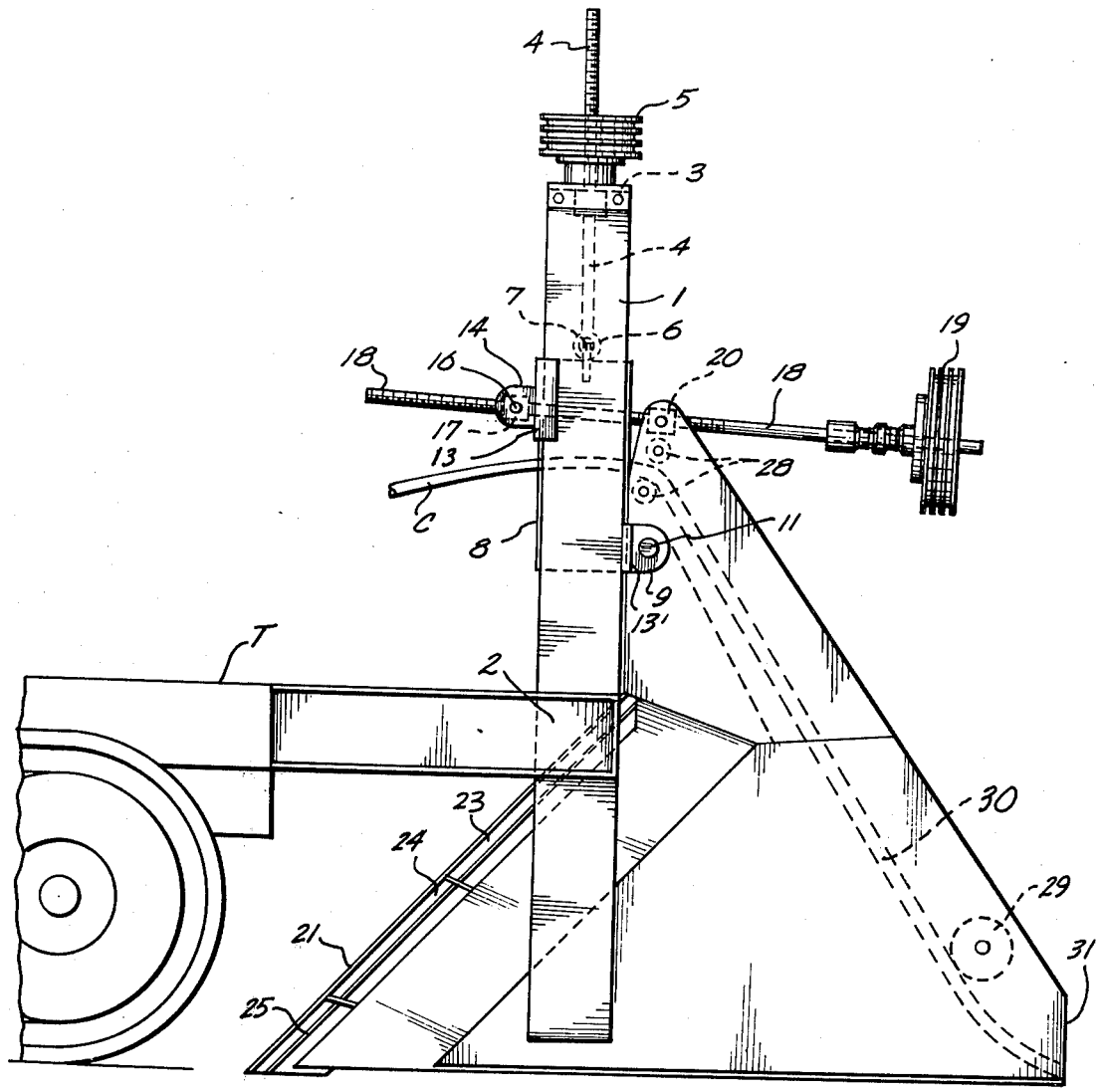
FIG. 6 is a side elevation of the line-laying apparatus of FIG. 5.

The preferred form of line-laying apparatus in accordance with the present invention includes a plow-like trench cutter, shown in FIG. 1, a vertical frame, shown in FIG. 2, adapted to be carried by a tractor and a slide fitted between ways of the frame and carrying the trench cutter as shown in FIGS. 5 and 6.

An upright frame including frame plates or ways 1 is rigidly supported by and coupled to the rear of a tractor, such as tractor T shown in FIGS. 5 and 6, by conventional spaced mounting and coupling spars 2. The upper ends of the vertical frame plates are connected by a horizontal crossbar 3. An upright threaded spindle 4 extends through a complementally threaded hole of a drive wheel 5 and through crossbar 3 into the space between the frame plates to constitute a powered jackscrew. The lower end of the spindle is formed by an eye 6 receiving a transverse coupling bar 7 of a slide 8 fitted between the frame plates or ways. Guide plates 13 and 13' projecting laterally from the opposite sides of the slide engage opposite upright edges of the ways and guide the slide for elevational adjustment along the ways effected by turning of the jackscrew spindle by drive wheel 5.

Slide 8 has lower rearward-extending lugs 9 having aligned holes 10 receiving a pivot pin 11. The central portion of such pin between lugs 9 passes through a hole 12 in the upper portion of the trench cutter. Thus pin 11 of slide 8 carries the trench cutter for pivoting relative to the slide, the frame plates and the tractor.

Slide 8 also includes upper, forward-extending lugs 14 each having a hole 15 receiving an end portion of a pin 16 which carries a nut 17 between such lugs. A right-and-left threaded turnbuckle spindle 18 extends through and connects nut 17 and a nut 20 pivotally mounted in the upper end of the trench cutter so that turning of spindle 18 will change the distance between nut 17 and nut 20 and will tilt the trench cutter about the axis of pin 11. Such tilting of the trench cutter can be achieved in any elevationally adjusted position of the slide 8 relative to the frame by rotation of wheel 19 fixed on the rear end of spindle 18.

The trench cutter features an impact leading or cutting edge 21 which is inclined forward and downward. Such cutting edge is formed by the forward edges of a plurality of parallel, closely spaced impact cutter bars 23, 24 and 25. Each of these bars forms part of an air hammer independent of the other bars by being connected to a pneumatic jack 27 by a piston rod 26 which reciprocates the cutter bar forward and back transversely of its length.

A passage extends diagonally downward through the trench cutter from its upper forward portion generally to the bottom and rear of the cutter for passage through the cutter of a line of cable or pipe to be laid. Guide rollers 28 are positioned adjacent to and at opposite sides of the upper forward portion of such passage and a lower guide roller 29 is positioned toward the rear of the passage and immediately above it.

In operation, tractor T is moved in a forward direction and the leading or cutting edge 21 of the trench cutter cuts a trench behind the tractor. The depth of the trench can be selected by turning drive wheel 5 to effect the desired elevational adjustment of slide 8 relative to ways 1 and tractor T without altering the angle of attack of the cutting edge of the cutter. However, such angle can be adjusted without appreciably altering the elevation of the cutter by turning adjustement wheel 19 to turn turnbuckle spindle 18. Cable or pipe line supplied to the foward end of the passage 30 through the trench cutter passes between upper guide rollers 28 and forward of and under lower guide roller 29 to guide the cable or pipe line generally to the bottom of the trench cutter. The line leaves the trench cutter through the exit 31 of the passage. By use of such apparatus a trench is cut and line is laid in the trench in one continuous operation.

I claim:

1. Line-laying apparatus for a tractor comprising:
   a frame rigidly connectible to the tractor, said frame including horizontally spaced upright ways and a crossbar bridging between said ways;
   a trench cutter including a generally upright leading cutting edge and a passage for supplying line generally to the bottom of said trench cutter;
   a slide fitted between said ways below said crossbar and carrying said trench cutter;
   means guiding said slide for elevational movement along said ways for elevational adjustment of said trench cutter relative to said frame;
   a rod extending through said crossbar and carrying said slide;
   means for moving said rod generally axially, elevationally relative to said crossbar, for adjusting the elevation of said trench cutter relative to said frame while maintaining said trench cutter leading cutting edge at a substantially constant angle of inclination;
   means pivotally connecting said trench cutter to said slide; and
   means for swinging said trench cutter relative to said slide about a generally horizontal axis extending laterally of said trench cutter while maintaining said frame stationary relative to the tractor to adjust the angle of inclination of the trench cutter leading cutting edge.

2. The line-laying apparatus defined in claim 1, in which the rod is a threaded spindle, and the rod-moving means includes a drive wheel resting on the crossbar and having a threaded hole receiving said spindle.

3. The line-laying apparatus defined in claim 1, in which the swinging means horizontal axis is generally behind the trench cutter leading cutting edge.

4. The line-laying apparatus defined in claim 1, in which the trench cutter includes an impact cutter having a forward edge forming at least a portion of the trench cutter leading edge and means for reciprocating said impact cutter forward edge.

5. The line-laying apparatus defined in claim 5, in which the trench cutter includes a plurality of elongated generally parallel closely spaced impact cutter bars having respective forward edges cooperatively forming the trench cutter leading cutting edge, and the reciprocating means includes air hammer means for reciprocating each impact cutter forward edge independently of the forward edges of other cutters.

6. Line-laying apparatus for a tractor comprising:
   a frame connectible to the tractor and having upright ways;
   a trench cutter including a generally upright leading cutting edge and a passage for supplying line generally to the bottom of said trench cutter;
   a slide pivotally carrying said trench cutter for swinging of said trench cutter relative to said slide about a generally horizontal axis extending laterally of said trench cutter;
   means guiding said slide for elevational movement along said ways for elevational adjustment of said trench cutter relative to said frame;
   screw means interconnecting said slide and said trench cutter; and
   means for turning said screw means for swinging said trench cutter relative to said slide about said horizontal axis to adjust the angle of inclination of said trench cutter leading cutting edge.

7. The line-laying apparatus defined in claim 6, in which the frame is rigidly connectible to the tractor for maintaining the frame stationary relative to the tractor during swinging of the trench cutter.

* * * * *

UNITED STATES PATENT AND TRADEMARK OFFICE
CERTIFICATE OF CORRECTION

PATENT NO. : 4,269,541
DATED : May 26, 1981

INVENTOR(S) : Marcel Altmann

It is certified that error appears in the above—identified patent and that said Letters Patent are hereby corrected as shown below:

Title page, column 2, beneath the text of the abstract, cancel "7 Drawing Figures" and insert ---6 Drawing Figures---.

Column 4, line 16, cancel "5", second occurrance, and insert ---4---.

Signed and Sealed this

Eleventh Day of August 1981

[SEAL]

Attest:

Attesting Officer

GERALD J. MOSSINGHOFF

Commissioner of Patents and Trademarks